April 15, 1924.

J. C. CROMWELL

METHOD OF MAKING WHEELS

Original Filed Dec. 5, 1919   6 Sheets-Sheet 1

1,490,592

Witness
R. H. Balderson

Inventor
John C. Cromwell
By Bakewell, Byrnes, Parmelee
his Atty.

April 15, 1924.
J. C. CROMWELL
METHOD OF MAKING WHEELS
Original Filed Dec. 5, 1919   6 Sheets-Sheet 2
1,490,592
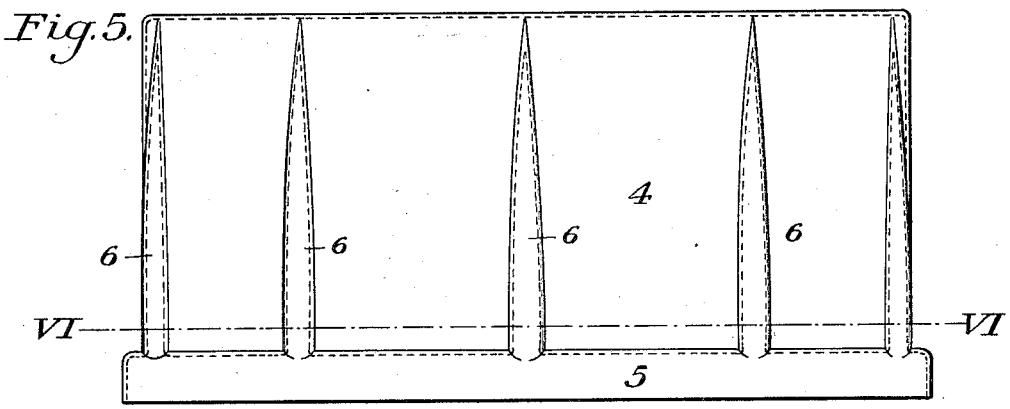
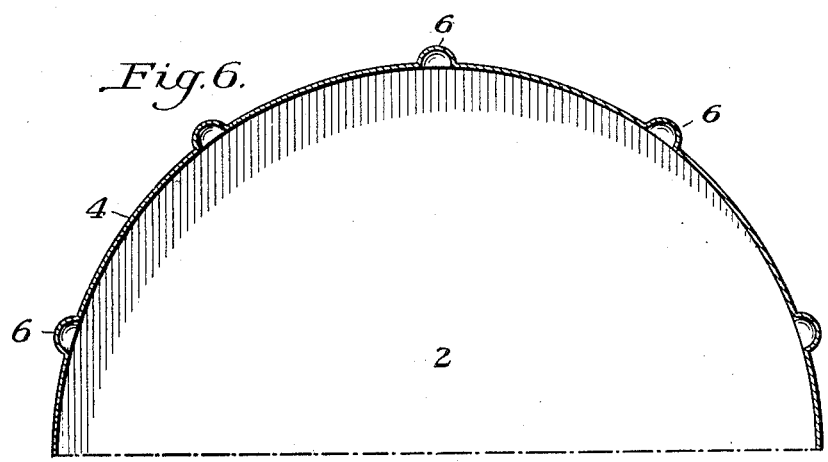
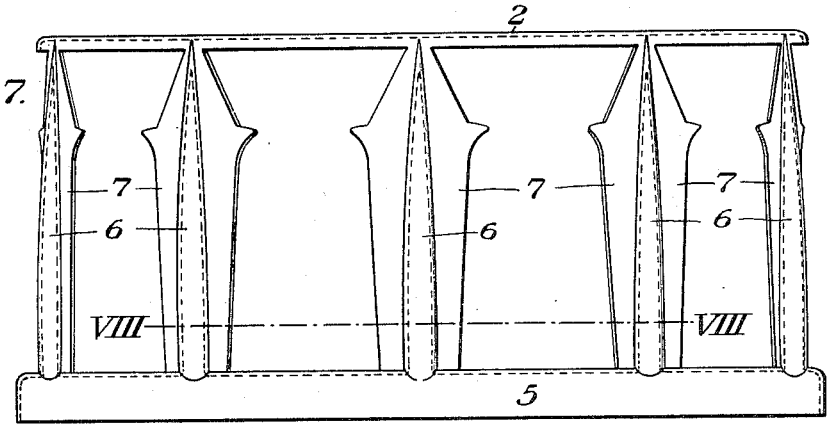
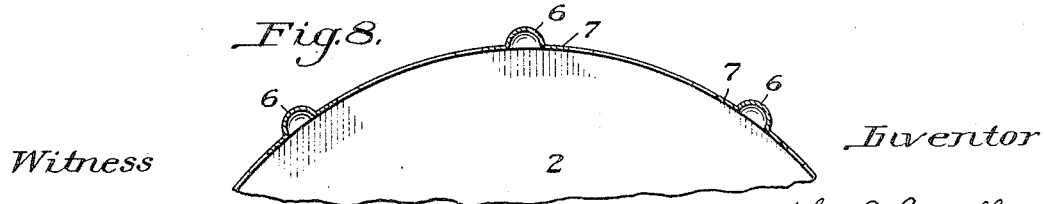
Witness
R A Balderson
Inventor
John C. Cromwell
by Bakewell, Byrnes & Parmelee
his attys April 15, 1924.

J. C. CROMWELL 1,490,592

METHOD OF MAKING WHEELS

Original Filed Dec. 5, 1919    6 Sheets-Sheet 3

Witness
R. A. Balderson

Inventor
John C. Cromwell
by Bakewell, Byrnes & Parmelee
his Attys.

April 15, 1924. 1,490,592
J. C. CROMWELL
METHOD OF MAKING WHEELS
Original Filed Dec. 5, 1919  6 Sheets-Sheet 4

Witness
R. H. Balderson

Inventor
John C. Cromwell
by Bakewell, Byrnes & Parmelee
his Atty.

April 15, 1924.

J. C. CROMWELL

METHOD OF MAKING WHEELS

Original Filed Dec. 5, 1919    6 Sheets-Sheet 5

1,490,592

Witness
R. A. Balderson

Inventor
John C. Cromwell
by Bakewell, Byrnes, Parmelee
his Attys.

April 15, 1924.                                              1,490,592
J. C. CROMWELL
METHOD OF MAKING WHEELS
Original Filed Dec. 5, 1919    6 Sheets-Sheet 6
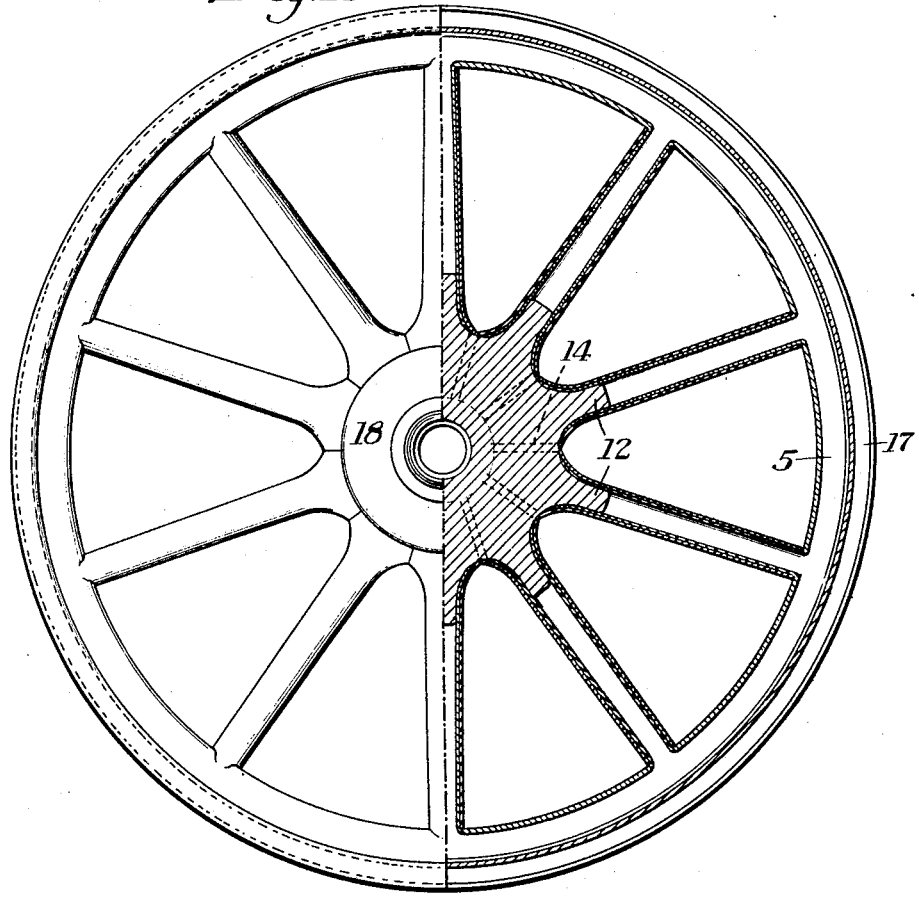
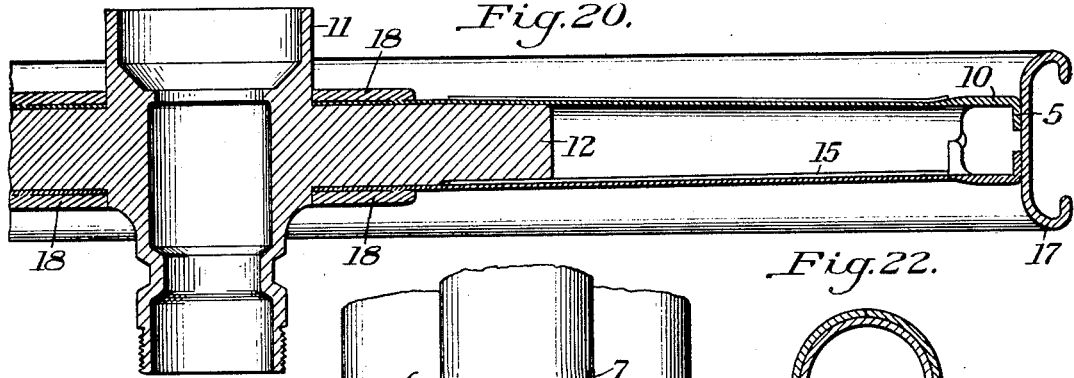
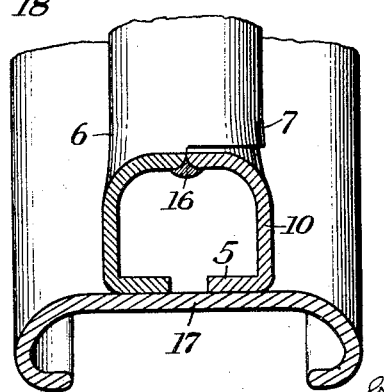
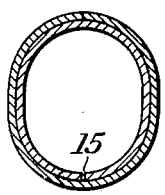

Patented Apr. 15, 1924.

1,490,592

UNITED STATES PATENT OFFICE.

JOHN C. CROMWELL, OF COLUMBUS, OHIO.

METHOD OF MAKING WHEELS.

Application filed December 5, 1919, Serial No. 342,765. Renewed September 17, 1923.

*To all whom it may concern:*

Be it known that I, JOHN C. CROMWELL, a citizen of the United States, residing at Columbus, in the county of Franklin and State of Ohio, have invented a new and useful Improvement in Methods of Making Wheels, of which the following is a full, clear, and exact description, reference being had to the accompanying drawings, forming part of this specification.

The present invention relates broadly to a method of making wheels, and more particularly to a method of making steel wheels.

The important object of the present invention is to construct a metallic wheel having the same general appearance as the usual wooden wheel. Another object of the invention is to construct a wheel having a unitary rim-supporting portion, whereby the wheel bodies may have rims of any desired type or size applied thereto.

Still another object of the present invention is to provide an improved method of making wheels, which method consists in a series of steps each of which may be readily and easily performed by the use of drawing, bending or punching machines of standard types, slightly modified to perform the specific functions required.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 5 is a side view of the blank after it has been subjected to a corrugating operation.

Figure 6 is a sectional view on the line VI—VI of Figure 5.

Figure 7 is a side view of the blank after the material between the spoke-forming portions has been removed.

Figure 8 is a sectional view on the line VIII—VIII of Figure 7.

Figure 19 is a view partly in section illustrating the wheel after the rim and hub flanges have been applied thereto.

Figure 20 is a diametrical section through the finished wheel.

Figure 21 is an enlarged detail view of the rim-supporting portion having a rim applied thereto, and Figure 22 is a cross-sectional view of one of the finished spokes.

In carrying out the preferred form of my invention, I preferably first form by suitable drawing operation, a dish-shaped blank having a bottom portion with walls extending at substantially right angles thereto. This blank may be drawn to a thickness throughout corresponding to the maximum thickness required in the finished wheel. The blank is then preferably subjected to a crimping operation to form a rim-supporting portion thereon. The metal in the walls of the blank is then preferably reduced to the proper thickness for forming the spokes by a second drawing operation which deepens the blank to an extent sufficient for insuring the proper length of material for forming spokes. After a blank of this shape has been produced, it may be subjected in turn to corrugating, punching and bending operations in succession for the production of spoke-forming portions. According to the present invention, two blanks having the construction described and of the same or substantially the same dimensions, are then placed face to face on opposite sides of a hub member having radial projections, and bent into position around said projections for securing the hub in position. The rim-supporting portions of the blank may then be circumferentially welded and a suitable rim applied thereto.

The present invention embodies improvements over the methods illustrated and claimed in my co-pending application Serial No. 303,817, filed June 13, 1919.

Figure 1:
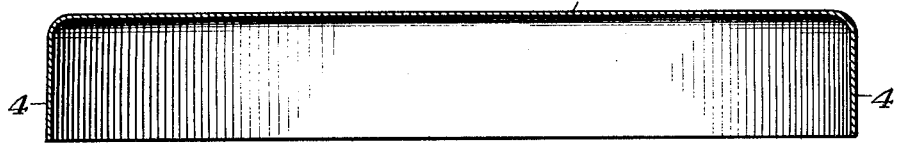
Figure 1 is a sectional view illustrating a blank from which substantially half of the wheel is to be formed.
Figure 2:
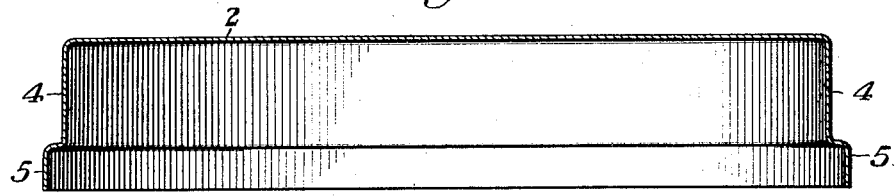
Figure 2 is a sectional view illustrating the blank after the second or crimping step has been performed thereon.
Figure 3:
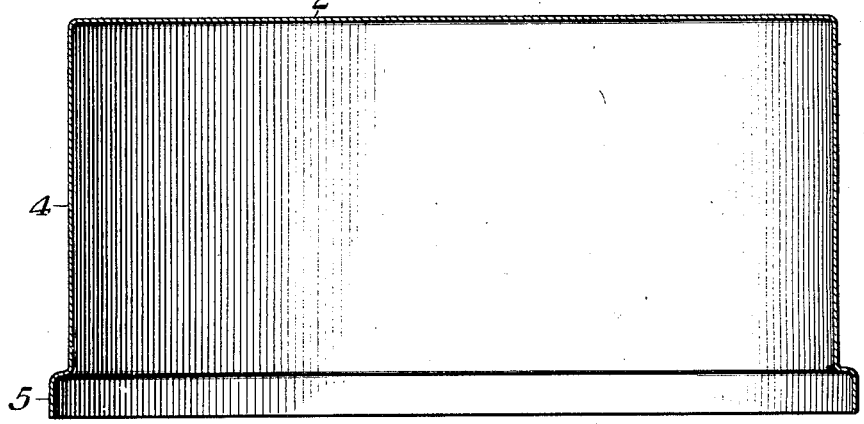
Figure 3 is a sectional view of the blank after the third or deepening drawing operation has been performed thereon.
Figure 4:
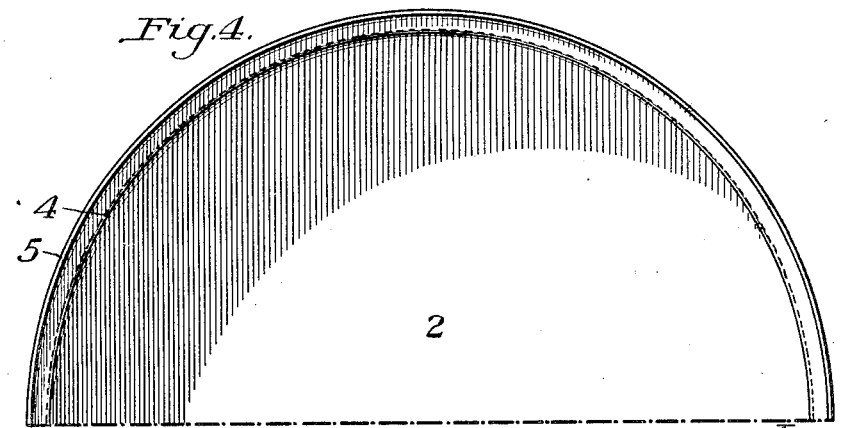
Figure 4 is a bottom plan view of the structure shown in Figure 3.
Figure 9:
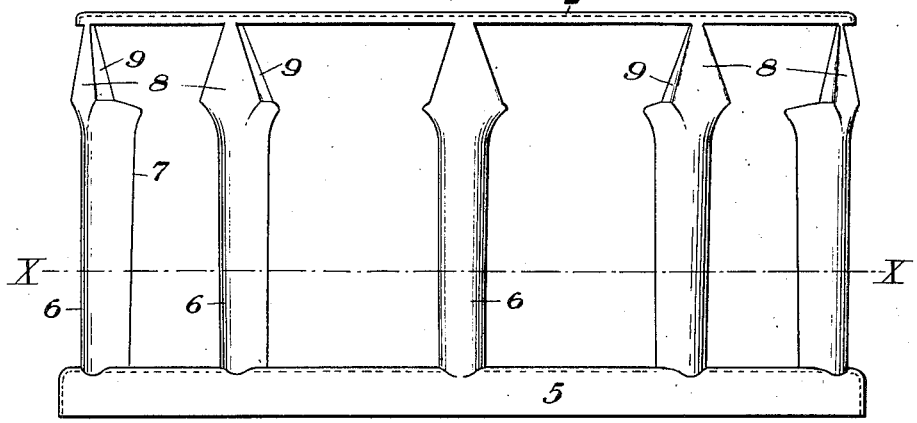
Figure 9 is a view corresponding to Figure 7 illustrating the method of preliminarily shaping the spokes.

Referring more particularly to the drawings, in carrying out the preferred form of my invention for producing metallic wheels, I first form a blank such as shown in Figure 1, comprising a dish-shaped member having a bottom 2 and side walls 4 at substantially right angles thereto. This blank is then preferably subjected to a crimping or spinning operation to form an enlarged rim-supporting portion 5 thereon. The blank is of such thickness that the rim-supporting portion will have a thickness equal to the thickness which it is desired to have in the finished wheel. It is desirable that the material be slightly thinner for forming the main body of the spokes, and for accomplishing this thinning, the blank shown in Figure 2 is subjected to a drawing operation which considerably deepens the blank so that the sides thereof are of sufficient length to form spoke-forming portions.

Figure 10:
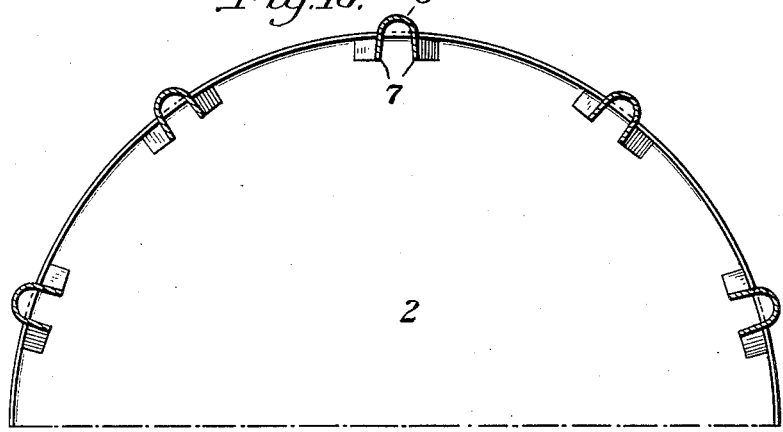
Figure 10 is a sectional view on the line X—X of Figure 9.
Figure 11:
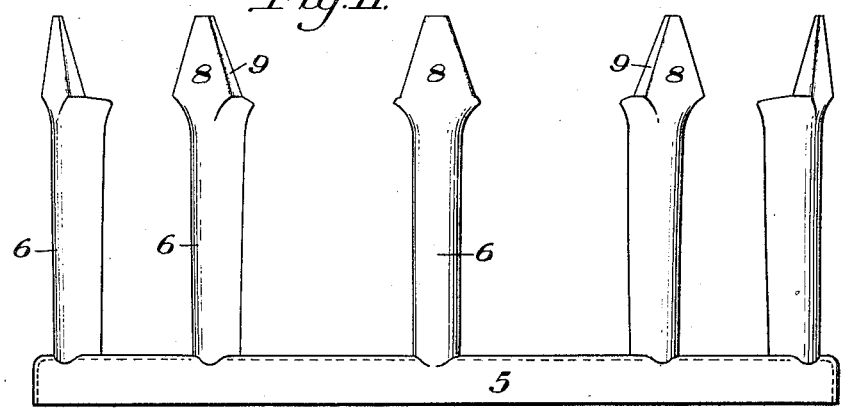
Figure 11 is a side view of the blank after the bottom has been removed.

The blank, after it has been deepened in the manner described, is subjected to a corrugating step which produces ribs or corrugated portions 6 in the walls 4, these ribs being formed at each of the points at which it is desired to produce a spoke. The blank is then punched or cut, preferably cold, to remove a considerable portion of the material betwen the ribs 6 and produce spoke-forming portions which comprise the ribs and side flanges 7. The flanges 7 of each of the spoke-forming portions are then bent inwardly into substantially U-shape as clearly shown in Figure 10.

During all of the foregoing operations, the spokes have been held in position for the performance of the necessary operations thereon by means of the bottom of the blank. This bottom is now removed in any desired manner leaving the spokes unsupported at their inner ends. At these inner ends, each of the spoke-forming portions is preferably bent into such shape that there is provided a flat triangular shaped body 8 having flanges 9 projecting at right angles therefrom. These flanges 9 are formed from the flanges 7 during the bending thereof into substantially U-shape as before described.

Figure 12:
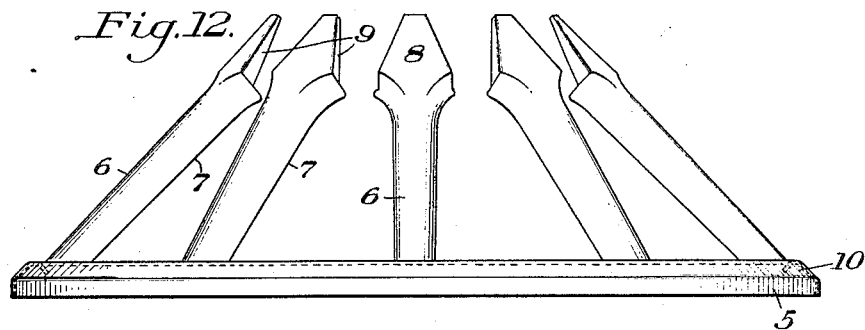
Figure 12 is a side view of the blank after a portion thereof has been bent substantially 45 degrees.
Figure 13:
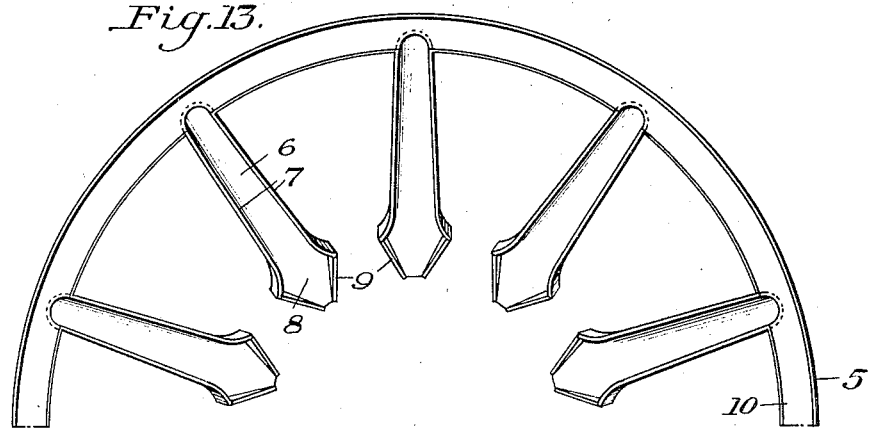
Figure 13 is a bottom plan view of that portion of the blank illustrated in Figure 12.
Figure 14:
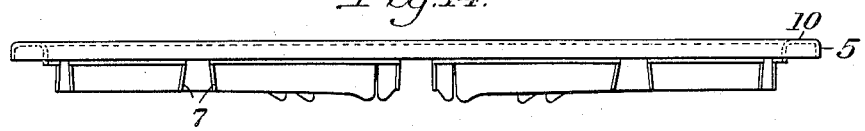
Figure 14 is a side view of the blank after the spoke-forming portions have been bent into the plane of the wheel.
Figure 15:
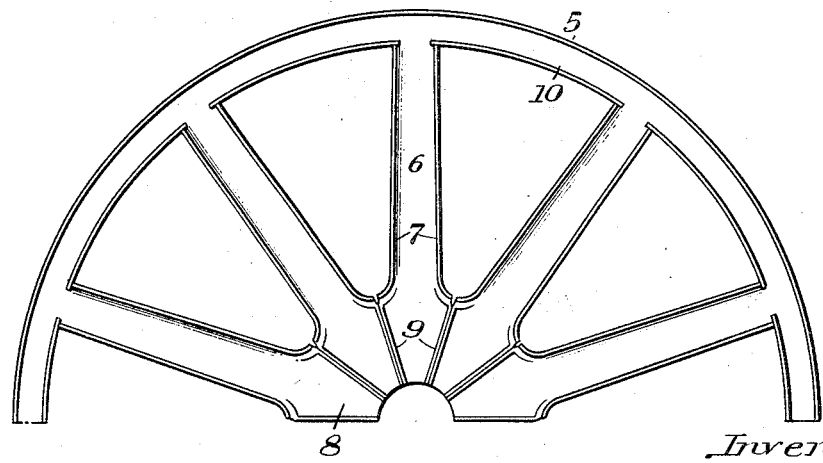
Figure 15 is a bottom plan view of the construction shown in Figure 14.
Figure 16:
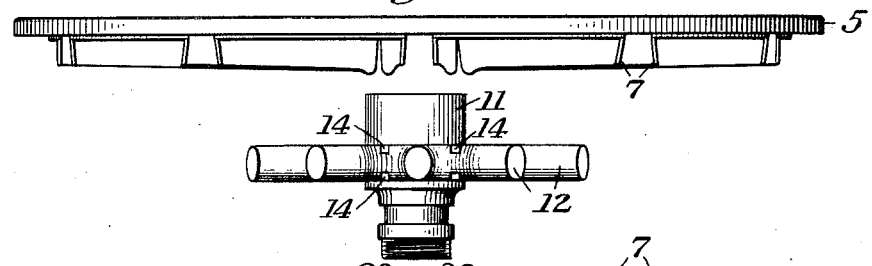
Figure 16 illustrates the method of assembling two blanks with a hub member.
Figure 17:
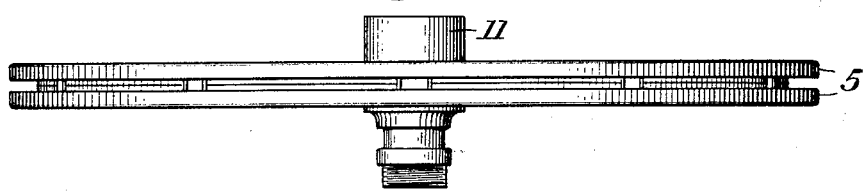
Figures 17 and 18 illustrate a partially completed wheel having the hub member in position.
Figure 18:
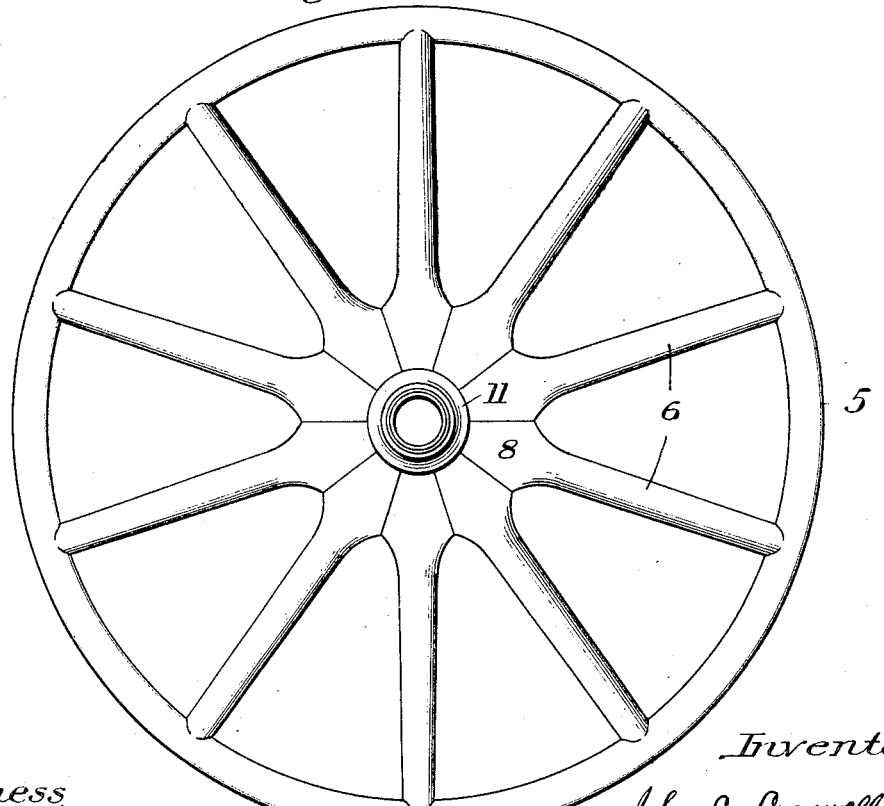

By a suitable bending operation, the spoke-forming portions and a section of the rim-supporting portion 5 are bent at substantially 45 degrees to their original position into the general shape illustrated in Figure 12. In the next step, this bending operation is completed and the spoke-forming portions and section 10 of the rim-supporting portion are bent into the plane of the wheel perpendicular to the axis of rotation thereof.

A pair of blanks of the construction described and having substantially the same dimensions throughout, are then placed face to face on opposite sides of a hub member 11 having radial projections 12 thereon, between which are formed radially extending grooves 14. The blanks are then pressed into position around the hub member so that the spoke-forming portions of one of the blanks enclose the radial projections on the hub member, and the spoke-forming portions of the other blank enclose the spoke-forming portions of the first mentioned blank. At the same time, the right angle flanges 9 are pressed into the radially extending grooves 14 of the hub member so that the outer surfaces of all of the spoke-forming portions lie in substantially the same plane. By this operation, there are produced substantially tubular double walled spokes, which spokes co-operate and securely interlock with the radial projections on the hub member. It will be obvious that the number of radial projections on the hub member corresponds to the number of spoke-forming portions in each of the blanks.

It is desirable that in the complete structure the edges of the spoke-forming portions of the outer blank meet throughout their entire length so as to produce a seam or joint which is not readily discernible. In order to insure such meeting of the edges of the spoke-forming portions of the outer blank, the width of the spoke-forming portions of the inner blank may be made slightly less than the corresponding portions in the outer blank whereby in the finished structure a slight gap 15 is produced between these inner meeting edges. It will be apparent that by exactly proportioning the parts, a closed joint may be formed between the meeting edges of both of the blanks.

After the hub member has been secured in position in the manner described, the cooperating edges of the rim-supporting portions may be welded as indicated at 16, and a rim 17 of any desired construction may be secured in position.

After the spoke-forming portions of the blank have been clinched to each other about the hub member, I preferably fasten on each face of the hub an annular flange 18. These annular flanges may be secured to the wheel structure in any desired manner and firmly support the inner ends of the spokes.

It will be apparent that during the making of wheels in the manner described, the blanks may be heat treated and annealed at various points to facilitate the formation of the wheels and increase the necessary strength in the finished structure.

The advantages of my invention result from a method of manufacturing wheels whereby it is possible to form a metallic wheel very similar in appearance to a wheel having wooden spokes, by a series of steps which involve only the usual drawing, bending and punching operations.

The wheel structure disclosed in the present application is made the subject matter of a separate application Serial No. 352,531, filed Jan. 19, 1920.

I claim:

1. The method of making wheels, comprising forming a blank having a rim-supporting portion thereon, punching the blank to produce spoke-forming portions, placing two such blanks face to face on opposite sides of a hub member having projections, and pressing said members together to simultaneously form substantially tubular spokes and secure the projections on the hub within said spokes, substantially as described.

2. The method of making wheels, comprising forming a dish-shaped blank, having a rim-supporting portion thereon, punching the blank to produce spoke-forming portions, removing the bottom of the blank, bending the spoke-forming portions into the plane of the wheel, placing two such blanks face to face on opposite sides of a hub member having radial projections, and pressing said members together to simultaneously form substantially tubular spokes and to secure the projections on the hub member within said spokes, substantially as described.

3. The method of making wheels, comprising forming a series of endless blanks, each having a circular rim-supporting portion and spoke-forming portions, bending the spoke-forming portions of a pair of blanks around a hub member and applying a rim to said rim-supporting portions of the blanks, substantially as described.

4. The method of making wheels, comprising forming a series of endless blanks, each having a rim-supporting portion and spoke-forming portions, said spoke-forming portions extending at substantially right angles to the plane of the wheel, bending said spoke-forming portions into the plane of the wheel and securing the spoke-forming portions of a pair of blanks about a hub member, substantially as described.

5. The method of making wheels, comprising forming a dish-shaped blank having a rim-supporting portion thereon, producing spoke-forming portions in the walls of said blank, bending said spoke-forming portions into the plane of the wheel, bending the spoke-forming portions of a pair of blanks around a hub member and then applying a rim to the rim-supporting portions of the blanks, substantially as described.

6. The method of making wheels, comprising forming a dish-shaped blank having a rim-supporting portion thereon, corrugating the walls of said blank, producing spoke-forming portions each including one of said corrugations, bending said spoke forming portions into the plane of the wheel, and then bending the spoke-forming portions of a pair of blanks about a hub member, substantially as described.

7. The method of making wheels, comprising forming a dish-shaped blank, corrugating the walls thereof, cutting away portions of the blank to provide spoke-forming portions each including one of said corrugations, bending said spoke-forming portions into the plane of the wheel, and then bending the spoke-forming portions of a pair of blanks about a hub member, substantially as described.

8. The method of making wheels, comprising forming a blank having a series of corrugations therein, removing a part of the metal between said corrugations to produce spoke-forming portions, and then bending the spoke-forming portions of a pair of blanks about a hub member, substantially as described.

9. The method of making wheels, comprising forming a dish-shaped blank having corrugations therein, removing a part of the metal between said corrugations to provide spoke-forming portions adjacent each of said corrugations, and securing a hub member between the spoke-forming portions of a pair of said blanks, substantially as described.

10. The method of making wheels, comprising forming a dish-shaped blank having a series of corrugations therein, removing a part of the metal between said corrugation to provide spoke-forming portions adjacent each of said corrugations, removing the bottom of the blank, bending said spoke-forming portions into the plane of the wheel, and then securing a hub member between the spoke-forming portions of a pair of said blanks, substantially as described.

11. The method of making wheels, comprising forming a blank having the maximum thickness required, subjecting said blank to a drawing operation to reduce the thickness of part of the blank, producing spoke-forming portions in the thin portion of said blank and securing a hub member between the spoke-forming portions of a pair of said blanks, substantially as described.

12. The method of making wheels, comprising forming a blank having the maximum thickness required, producing a rim-supporting portion therein, extending a portion of the blank to reduce the thickness thereof, producing spoke-forming portions in the extended portion of said blank, partially shaping said spoke-forming portions, and securing a hub member between the spoke-forming portions of a pair of said blanks, substantially as described.

In testimony whereof I have hereunto set my hand.

JOHN C. CROMWELL.